Jan. 3, 1950     G. C. AUBIN     2,493,332
ALIGNING DEVICE

Filed June 7, 1945     2 Sheets-Sheet 1

INVENTOR
Gerald C. Aubin

Jan. 3, 1950 G. C. AUBIN 2,493,332
ALIGNING DEVICE
Filed June 7, 1945 2 Sheets-Sheet 2
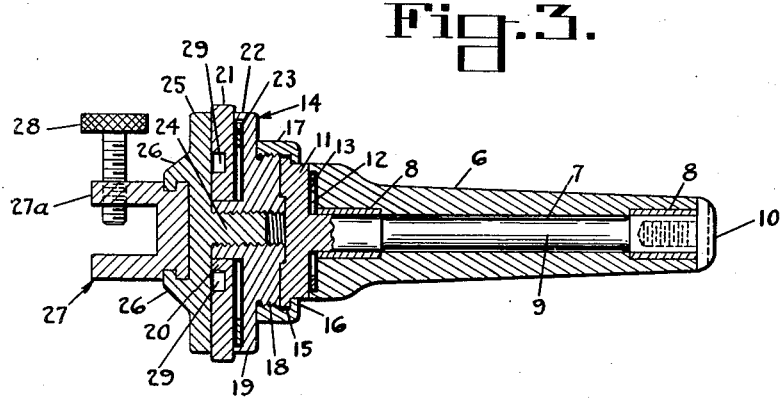
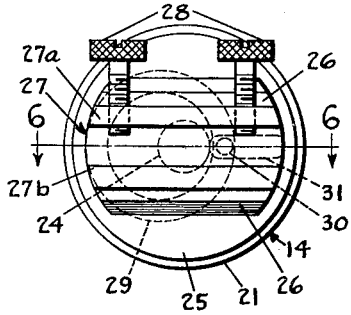 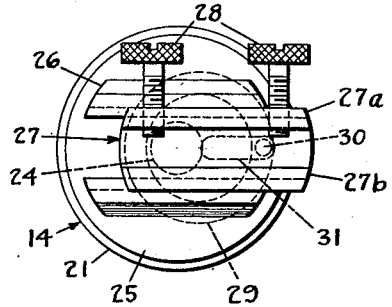
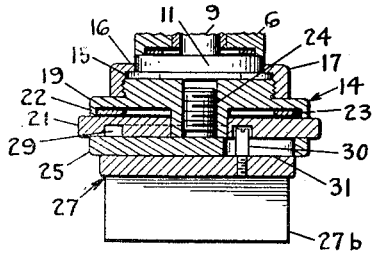
INVENTOR
Gerald C. Aubin Patented Jan. 3, 1950

2,493,332

UNITED STATES PATENT OFFICE 2,493,332

ALIGNING DEVICE

Gerald C. Aubin, Burlington, Vt.

Application June 7, 1945, Serial No. 598,143

5 Claims. (Cl. 33—172)

1

This invention relates to improvements in work-locating or -aligning devices adaptable for use in connection with machine tools such as lathes, and pertains particularly to precision centering devices adapted to cooperate with standard type gauges for visual indication.

A primary object of the invention is to provide a device of the above-mentioned character to be simply and securely mounted in the tail stock of a lathe and which is adapted to adjustably support and cooperate with standard type gauges for visual indication.

Another important object of the invention is the provision of a device of the character described which may be rotatably mounted in the tail stock of a lathe and provided with means whereby minute adjustment of the gauge against a member to be centered may be simply and quickly made, and means for revolving the gauge in an orbital path about the member for visual indication of the out-of-alignment position of the member.

Another object of the invention is the provision of a centering device of the character described which is comparatively simple in construction and durable, accurate and efficient for the purpose intended.

Further objects and advantages attained by the invention will appear readily from the following description of a preferred embodiment thereof, as illustrated in the accompanying drawings, in which:

Fig. 3 is a sectional view of the invention taken on line 3—3 of Fig. 2;

Figs. 4 and 5 are end views of the invention showing the adjustable gauge clamping means at the extreme limits of its travel in both directions; and Fig. 6 is a view partly in section taken on line 6—6 of Fig. 4.

Figure 1:
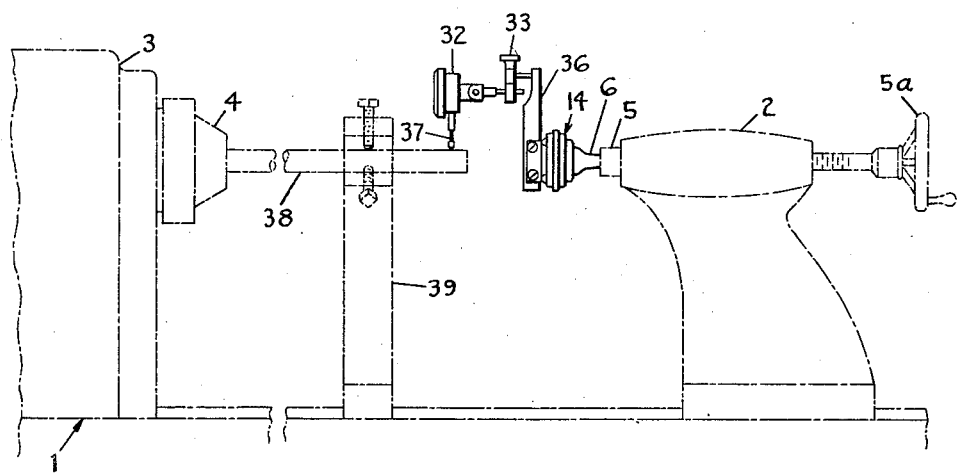
Fig. 1 is a front elevation of part of a lathe showing the invention mounted in the tail stock thereof and in operative position.

Referring now by characters of reference to the drawings, numeral I designates a lathe of a common well-known type which is provided with the usual movable holder or tail stock mechanism 2, lathe operating mechanism 3, and a second spaced holder or chuck 4.

The tail stock 2 is provided with the usual longitudinally movable spindle 5 and dislodging mechanism controlled by the handle 5a, the

2 spindle having a tapered longitudinal opening adapted to receive the tapered quill or journal 6 of the invention. The journal 6 is outwardly shaped similar to a standard lathe center shank, having a taper coincident with the taper of the opening in the spindle 5 and adapted to be held securely therein by friction.

The journal 6 is provided with a longitudinal bore 7 (Fig. 3), the ends of which are slightly enlarged for reception of bushings 8, and mounted in the bore 7 and rotatable in the bushings 8 is an operating shaft 9, the ends of which are slightly enlarged for engagement with the bushings 8 and thus providing a very limited amount of friction in the device. A headed stud 10 is screwed into the outer end of the shaft 9 in such a manner that the head of the stud abuts the end of the journal 6 and thus prevents the journal from sliding off the shaft 9.

The inner end of the journal 6 is flared to a diameter coincident with the diameter of a disc 11 formed on the inner end of the operating shaft 9 and is provided with a shallow hollowed portion 12 for reception of a friction spring washer 13 which acts as frictional retention means, portions of which are adapted to bear upon both the end of the journal 6 and the disc 11 of the operating shaft 9.

Thus when the journal 6 is secured in the tail stock spindle 5 of the lathe, the operating shaft 9, the disc 11 and stud 10 are all freely rotatable, impeded only by the resistance of the spring washer 13 which is of a character such as to retain the unit in any set position but also to allow unrestrained revolution of the shaft 9 upon application thereto of light manual pressure.

Attached to and rotatable with the disc 11 of the operating shaft 9 is the adjustable gauge-holding or crank mechanism 14. The disc 11 formed on the end of the operating shaft 9 is provided with a rim 15 which is adapted to loosely fit inside the flange 16 of a knurled cap 17.

The cap 17 is threaded on the inside and is adapted to receive the threaded inner hub 18 of a flanged mounting disc 19, the disc 19 being also provided with a smoothly finished and smaller dimensioned outer hub 20 on which is adapted to be rotatably mounted a knurled operating disc 21. The outer face of the mounting disc 19 is provided with a shallow hollowed portion, thus forming a retaining flange 22, a friction spring washer 23 being located in this hollow portion and adapted to be retained in place by the flange 22. The spring washer 23 is adapted to bear upon both the mounting disc 19 and operating disc 21 and thus control the rotation of the operating disc 21 upon hub 20.

A threaded bore is provided through the hub 20 of the mounting disc 19, the bore being adapted to receive the threaded shaft 24 of a fixedly mounted disc-shaped bracket carrier 25. The carrier 25 has a guide-way formed on the outer face thereof as defined by a pair of opposed horizontally extending arms 26, each of which is provided with an inwardly projecting flange, which flanges are adapted to receive and fit into opposed slots or tracks formed in the upper and lower faces of a horizontally extending bifurcated bracket 27. The upper and lower furcations of the bracket 27 have been designated in the drawings as 27a and 27b respectively, and the upper furcation 27a is provided with a pair of vertical threaded openings into each of which is screwed knurled thumb screws 28 which when screwed downwardly toward the lower furcation 27b will securely and immovably hold an object therebetween.

The bracket 27 is adapted to slide horizontally in the guideway formed by the opposed arms 26 of the carrier 25 and is controlled by the knurled operating disc 21. The disc 21, which is itself adapted to rotate about the hub 20, is provided with an eccentric circular groove or track 29 in its outer face which is adapted to receive a pin or stud 30 threaded in the base of the bracket 27 and located so as to project through a slotted opening 31 formed in and directed radially of the bracket carrier 25.

Thus, manual rotation of the knurled operating disc 21 consequently rotates the eccentric track 29 in such a manner that the track 29 will cause the pin 30 to slide transversely within the confinements of slotted opening 31 and subsequently cause the bracket 27 to slide in the arms 26 of the carrier 25.

This operation is designed to provide minute precision adjustment of the device by varying the effective length of a crank arm carrying a gauge, such variation being in a direction across the axis of the shaft element, and consequent proper adjustment of the feeler element of the gauge against a piece of work to be centered. As will be more clearly described hereinafter, the gauge is suitably mounted in and movable with the bracket 27 upon manual operation of the crank mechanism attached to the operating shaft 9.

Figure 2:
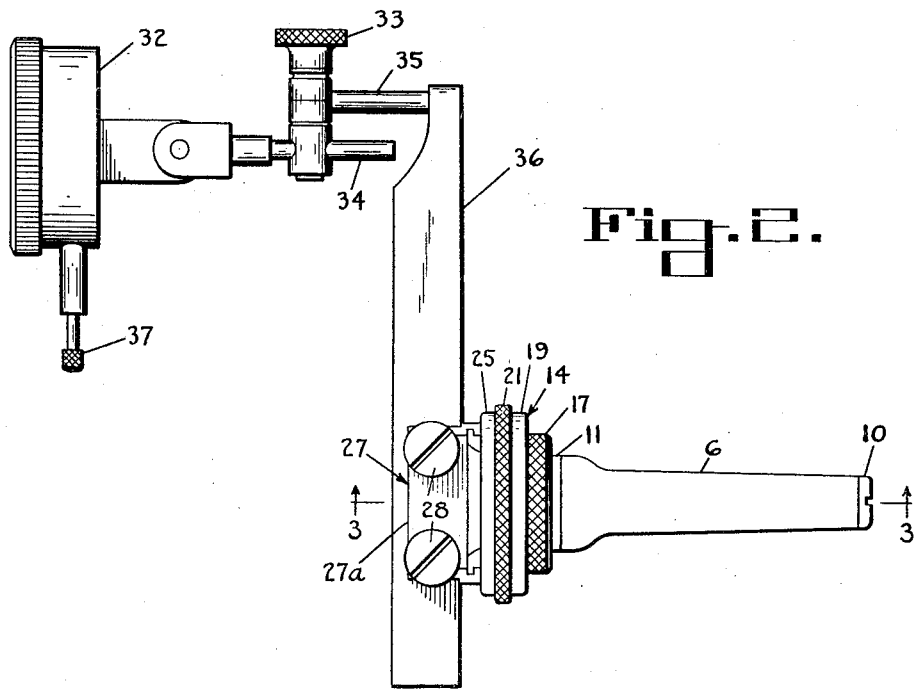
Fig. 2 is a front elevation of the invention also showing clearly a gauge, crank arm, and clamping means therefor.

To illustrate this I have shown in Figs. 1 and 2 a common well-known type of gauge 32 which is secured in a clamp 33, which clamp by means of slidable members 34 and 35 provides a very satisfactory adjustable connection of the gauge 32 to a crank arm 36 which is adapted to be adjustably held by the thumb screws 28 in the bracket 27. The gauge shown is provided with the usual depending operating or feeler member 37 which is adapted to engage an object, and the movement of the member 37 caused by such engagement of the member with the object will be indicated in thousandths of an inch on the gauge 32.

The complete setup is clearly illustrated in Fig. 1 wherein I have shown a lathe chuck 4 holding one end of a bar 38 or other type of work piece which is to be properly centered in the machine in order that a working operation may be performed thereupon. The outer end of the bar 38 is located in a steadyrest 39 or other suitable type of adjustable support, with the gauge feeler member 37 in a position engaging the bar 38 near its outer end.

Thus, in the operation of my invention, the bar 38 is secured by one end in the lathe chuck 4 and the other end of the bar is located in the adjustable steadyrest 39, while the tail stock 2 of the lathe is moved up to within a short space of the free end of the bar 38.

The invention with the gauge, crank arm and crank mechanism will then be located in the spindle 5 of the tail stock by means of the tapered journal 6 and will be held immovable therein. The lathe tail stock, with the centering device in a position similar to that shown in Fig. 1, is moved up to a position where the feeler member 37 of the gauge 32 will barely clear or lightly contact the surface of the bar 38 near its outer end.

At this point the operator will rotate the knurled operating disc 21 which will consequently, by means of the eccentric track 29, pin 30, and slotted opening 31, cause the bracket 27 to be precisely adjusted to bring the gauge 32, through crank arm 36, into closer or farther away relation to the bar 38, as desired by the operator upon referring to the indication shown on the gauge 32 and as indicated by means of the gauge feeler member 37. Thus, by this means precision adjustment of the device to vary the effective length of the crank arm obtains the desired results.

As an example, let us say that the member 37 is abutting the bar 38 and the gauge indicates a plus 10 thousandths of an inch. Therefore, the disc 21 will be turned in a direction to move the gauge away from the bar a sufficient distance to obtain a zero reading.

When the zero reading has been established, the operator will then grasp the knurled cap 17 and rotate the entire device, with the exception of the tapered journal 6 which is being held securely in the lathe tail stock spindle 5, thus turning the gauge orbitally about the bar 38 and enabling the operator to obtain the readings as described above.

Such operation will cause the gauge feeler member 37 to travel orbitally around the circumference of the bar 38, and thus by reading the plus or minus indications as shown by the gauge 32 the operator will readily and quickly learn in what direction the free end of the bar 38 will necessarily have to be moved in the steadyrest 39 in order to become properly centered.

While certain novel features of the invention have been shown and described and are pointed out in the annexed claims, it will be understood that various changes in the forms and details of the device illustrated may be made by those skilled in the art without departing from the spirit of the invention.

I claim:

1. In a centering device for use in the centering of a work piece in the head stock of a lathe, a gauge arranged to present a feller element toward the work piece to be centered, and to be orbitally moved about such work piece, a gauge holding arm, said gauge mounted thereon, a journal adapted for securement in the tail stock of the lathe, a shaft rotatable in said journal, a screw clamp carried by said shaft and engaging the holding arm, an eccentric connection between the clamp and the shaft constituting a precision adjustment of effective length of the gauge holding arm, and frictional retention means located to act on said eccentric connection and tending to maintain the eccentric in adjusted settings.

2. In a centering gauge assembly for use in the centering of a work piece in the head stock of a lathe, a journal adapted for positionment in the tail stock of the lathe, a shaft rotatable in the journal, a crank arm on said shaft, a gauge carried by the outer end of the crank arm, two knurled discs located near each other in the zone of shaft and crank arm connection, one such disc being connected to the shaft for manual rotation thereof, and the other disc and elements associated therewith being eccentrically connected to said crank arm for a precision adjustment means of the effective crank arm length, and resilient washer means providing a frictional resistance to the movement of, and self retention of each of said discs, tending to maintain the gauge in a predetermined portion of an orbital path about the work piece to be centered, and to maintain a predetermined adjustment of effective crank arm length.

3. A centering device for use in the centering of a work piece in a lathe, said device comprising a rotatable shaft, a shaft-actuating disc, a hub on said disc, a second disc adjustably mounted on said hub, the second disc being provided with an eccentric groove, a pin extending into the groove, a gauge-holding clamp, a plate by which the holding clamp is carried, the pin being arranged to actuate the plate for adjusting the position of the clamp, a gauge holder carried by the clamp and a gauge carried by the holder and arranged for orbital movement about the work piece to be centered, responsively to rotation of said shaft.

4. A device of the character described for use in the centering of work in a machine tool: said device comprising a journal member securable in the machine tool, a shaft rotatably mounted in said journal member with its longitudinal axis coinciding with the axial center line of the machine tool, mount means operably carried at one end of said shaft for rotary movement, an operating disc carried by said mount means for rotary displacement with respect thereto and having an eccentric track, a carrier disc fixed on said mount means adjacent said operating disc, said carrier disc having a radially directed slot therein, in registration with said eccentric track, a work centering gauge, means operatively connecting said gauge and carrier disc, and a drive element fixed in said last mentioned means to extend through said radial slot for engagement in the eccentric track, rotary displacement of the operating disc serving to effect, through the drive element, a precision and linear displacement of the centering gauge transversely of the shaft axis.

5. A device of the character described for use in the centering of work in a machine tool: said device comprising a journal member releasably securable in the machine tool, a shaft rotatably mounted in the journal member and directed with its longitudinal axis coinciding with the axial center line of the machine tool, mount means positioned at one end of said shaft, an operating disc on said mount means and adapted for rotational movement about the axis of said shaft, said operating disc being formed with an eccentric track, a carrier disc on said mount means adjacent said operating disc, said carrier disc being provided with a radially directed slot in registering relation with an adjacent portion of the eccentric track, a clamping bracket operably mounted on said carrier disc for movement in a direction normal to the shaft axis, a pin element carried in said bracket to extend through the radial slot for engagement in said eccentric track, rotational movement of said operating disc serving to effect, through the eccentric track, precision movement of said bracket relative to the carrier disc, and a work centering gauge operably secured to said clamping bracket in a laterally off-set relation with respect to the shaft axis, precision movement of the bracket by said operating disc effecting a change in the extent of laterally off-set positionment of the centering gauge relative to the axis of said shaft.

GERALD C. AUBIN.

REFERENCES CITED

The following references are of record in the file of this patent:

UNITED STATES PATENTS

| Number | Name | Date |
| --- | --- | --- |
| 1,264,910 | Elsasser | May 7, 1918 |
| 1,676,964 | Rankin | July 10, 1928 |
| 1,950,815 | Rhyne | Mar. 13, 1934 |
| 1,953,614 | King | Apr. 3, 1934 |
| 2,067,442 | Frisz | Jan. 12, 1937 |
| 2,073,089 | Antenreith | Mar. 9, 1937 |